(12) United States Patent
Schäfer

(10) Patent No.: US 7,120,763 B1
(45) Date of Patent: Oct. 10, 2006

(54) METHOD, ARRAY AND SET OF SEVERAL ARRAYS FOR PROTECTING SEVERAL PROGRAMS AND/OR FILES FROM UNAUTHORIZED ACCESS BY A PROCESS

(75) Inventor: Manfred Schäfer, Forstinning (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/763,029

(22) PCT Filed: Jul. 1, 1999

(86) PCT No.: PCT/DE99/02013

§ 371 (c)(1),
(2), (4) Date: Apr. 10, 2001

(87) PCT Pub. No.: WO00/11551

PCT Pub. Date: Mar. 2, 2000

(30) Foreign Application Priority Data

Aug. 19, 1998 (DE) .................................. 198 37 666

(51) Int. Cl.
*G06F 12/14* (2006.01)
*G06F 13/22* (2006.01)

(52) U.S. Cl. ................. 711/152; 711/153; 711/163; 710/220

(58) Field of Classification Search ................ 713/193, 713/155, 176, 179, 187, 200, 201; 705/55; 710/220; 711/202, 152–153, 163
See application file for complete search history.

(56) References Cited

U.S. PATENT DOCUMENTS

| | | | | |
|---|---|---|---|---|
| 3,609,697 A | | 9/1971 | Blevins et al. | |
| 4,037,215 A | * | 7/1977 | Birney et al. ............... | 711/202 |
| 5,023,773 A | * | 6/1991 | Baum et al. ................ | 710/220 |
| 5,023,907 A | | 6/1991 | Johnson et al. | |
| 5,142,676 A | * | 8/1992 | Fried et al. ................. | 711/152 |
| 5,343,527 A | * | 8/1994 | Moore ......................... | 713/179 |
| 5,390,310 A | | 2/1995 | Welland | |
| 5,485,409 A | * | 1/1996 | Gupta et al. ................ | 713/200 |
| 5,495,533 A | * | 2/1996 | Linehan et al. ............ | 713/155 |
| 5,611,075 A | * | 3/1997 | Garde ......................... | 711/153 |
| 5,638,446 A | * | 6/1997 | Rubin ......................... | 705/51 |
| 5,745,570 A | | 4/1998 | Voldal | |
| 5,765,153 A | | 6/1998 | Benantar et al. | |
| 5,940,513 A | * | 8/1999 | Aucsmith et al. .......... | 713/187 |

(Continued)

FOREIGN PATENT DOCUMENTS

WO 96/18951 6/1996

(Continued)

OTHER PUBLICATIONS

William Stallings, Operating Systems, 3. Aufl. Dec. 1997, 632-636 and 668-674.

(Continued)

*Primary Examiner*—Christopher Revak
*Assistant Examiner*—Arezoo Sherkat
(74) *Attorney, Agent, or Firm*—Staas & Halsey LLP

(57) ABSTRACT

An area and a process file are assigned to each program to be protected. The process or processes that may run in the corresponding area is or are stored in a process file. When the program is running, a process attempting to access the program is checked to confirm whether the accessing process is included in the corresponding process file. The accessing process is executed only if it is included in the process file.

16 Claims, 6 Drawing Sheets

U.S. PATENT DOCUMENTS

Figure 4:
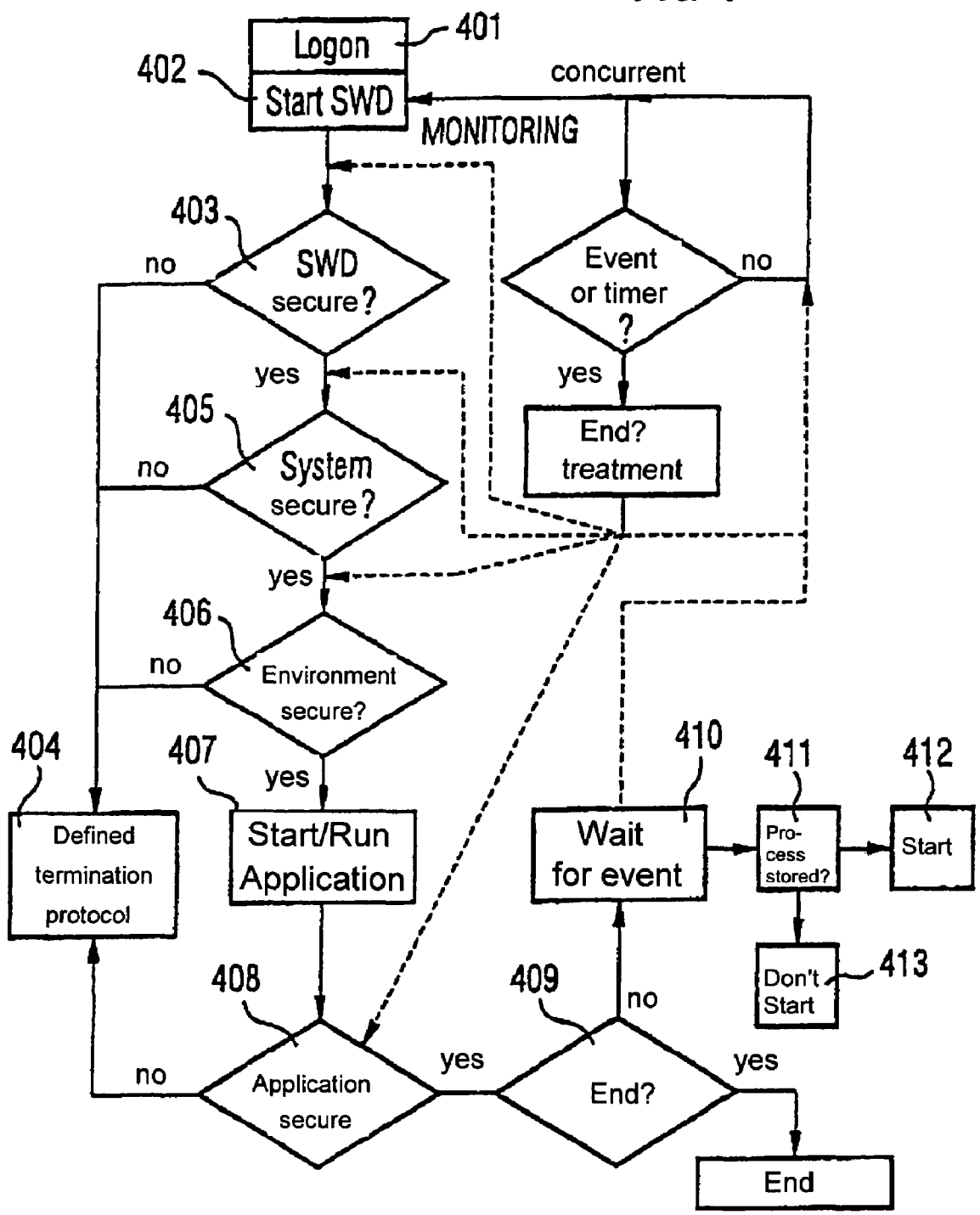

| | | | | |
|---|---|---|---|---|
| 6,044,445 | A | * | 3/2000 | Tsuda et al. ................ 711/163 |
| 6,272,631 | B1 | * | 8/2001 | Thomlinson et al. ....... 713/155 |
| 6,367,012 | B1 | * | 4/2002 | Atkinson et al. ........... 713/176 |
| 6,567,917 | B1 | * | 5/2003 | Ziese ......................... 713/187 |
| 2002/0073316 | A1 | * | 6/2002 | Collins et al. .............. 713/174 |

FOREIGN PATENT DOCUMENTS

WO    96 18951    6/1996

OTHER PUBLICATIONS

"Under The Hood", M. Pietrek, Microsoft Systems Journal, Dec. 1996, No. 12, pp. 67-73.

"Advanced Windows", Jeffrey Richter, ISBN 1-573231-548-2, 3rd Edition, S. 899ff., Kapitel Breaking Through Process-Boundary Walls, 1997.

Dr. Solomon's Anti-Virus Toolkit Workstation, Mar. 7, 1988.

"Microsoft Resource Kit" Comprehensive Resource Guide and Utilities for Windows NT 4,0, ISBN 1-5231-343-9, Microsoft Press, C. Doyle (ed.) S. 117-118, 1996.

"Windows NT System-Call Hooking", M. Russinovich et al., Dr. Dobb's Journal, Jan. 1997, pp. 42-46.

Inside Microsoft Windows NT, 2. Auflage, Microsoft Press, May 1998, pp. 219-221, 303-323.

International Search Report for corresponding PCT Application PCT/DE/02013.

* cited by examiner

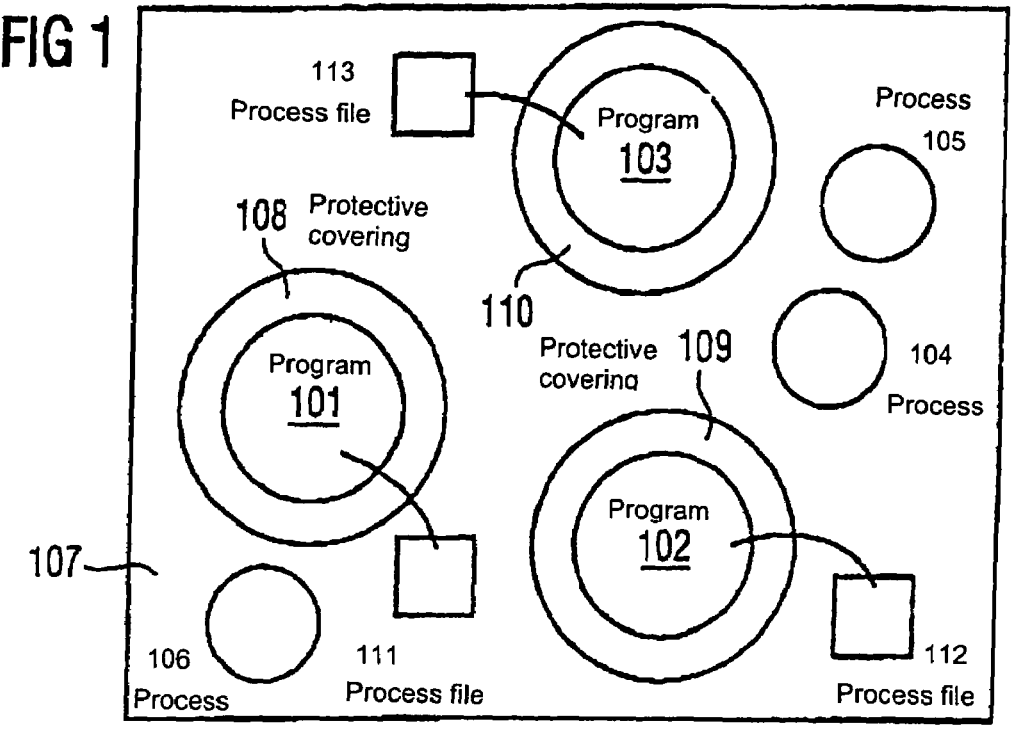
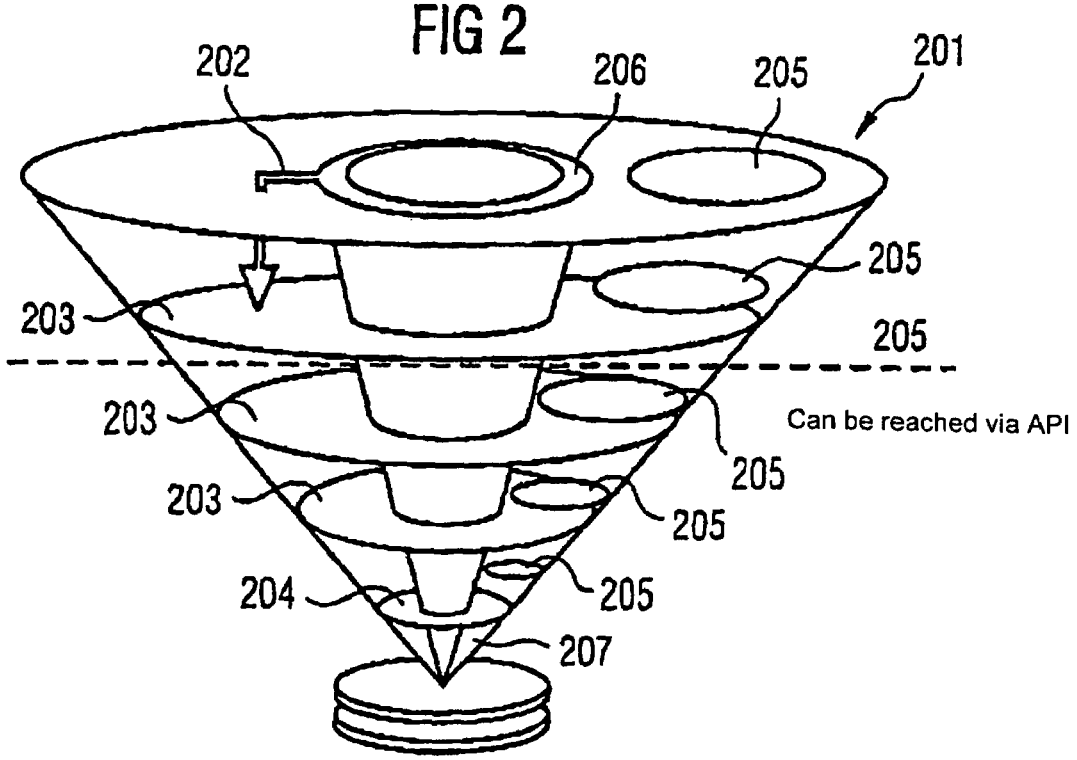

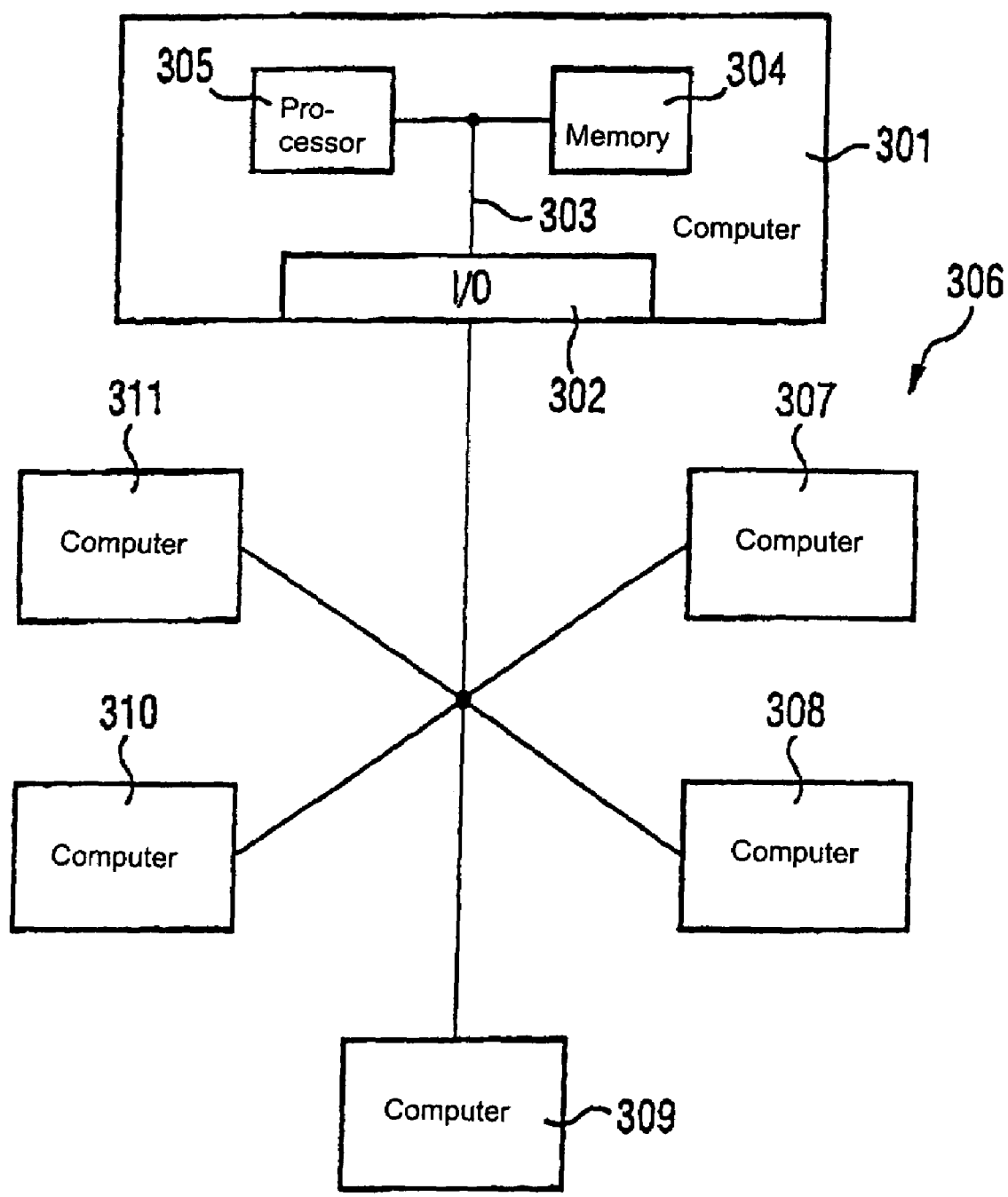

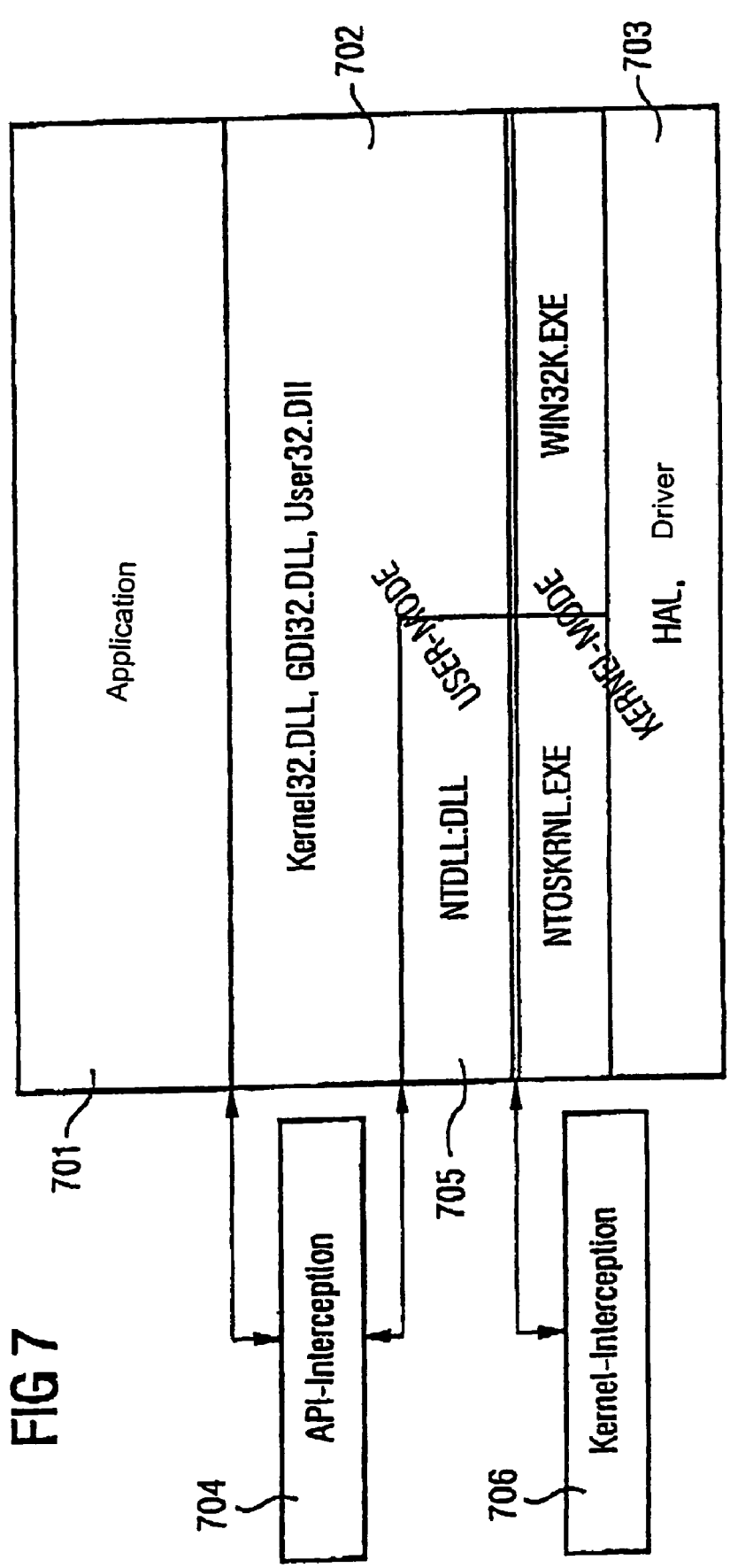

METHOD, ARRAY AND SET OF SEVERAL ARRAYS FOR PROTECTING SEVERAL PROGRAMS AND/OR FILES FROM UNAUTHORIZED ACCESS BY A PROCESS

The invention pertains to a method, an array and a set of several arrays for protecting several programs from unauthorized access by a process.

A method and an array for protecting several programs from unauthorized access by a user is known from [1] or [6]. In the method according to [1], the access protection for a program is realized in that an access authorization file is assigned to each user of a system. If a process attempts to access a program, a check is made to confirm whether the user who started the process has the right to access the program in question. The access is allowed only if the process was started by an authorized user, who is thus equipped with the access rights.

Known from [2] is a so-called virus scanner. A virus scanner checks the stored, known sequence of data by means of which the program is realized. If a discrepancy from the known sequence is found, a message is sent to a user of the system that there is a possibility that the system contains a virus.

Also known from [1] is an operating system for a computer. The operating system known from [1] exhibits a variety of security gaps through which a hacker can endanger the integrity of programs that are executed by using the operating system.

A possible mechanism for endangering the protection of programs during the use of an operating system is also described in [5].

In [7], a computer system for the licensing of software is described.

The invention is thus based on the problem of protecting several programs and/or several files from unauthorized access by a process when using an operating system that exhibits fundamental security gaps.

The problem is solved by the method and by the array in accordance with the features of the independent patent claims.

In a method for protecting several programs and/or several files from unauthorized access by a process, each program and/or each file to be protected is assigned an address space. In addition, each program and/or each file to be protected is also assigned a process file, whereby the process or processes that may run in the address space in question is or are stored in a process file. During the running of a program and/or a file to be protected, for a process that attempts to access the address space of the program and/or the file to be protected, a check is made to confirm whether the accessing process is included in the corresponding process file. If the accessing process is included in the process file, the accessing process is started; otherwise the accessing process is not started.

In an additional method for protecting several programs and/or several files from unauthorized access by a process, each program and/or each file to be protected is assigned an address space. In addition, each program and/or file to be protected is also assigned a process file, whereby the process or processes that may run in the address space in question is or are stored in a process file. During the running of a program and/or a file to be protected, for a process that attempts to access the address space of the program and/or a file to be protected, a check is made to confirm whether the accessing process is included in the corresponding process file. If the accessing process is included in the process file, the accessing process is continued; otherwise the accessing process is terminated.

An array for protecting several programs from unauthorized access by a process exhibits a processor that is set up in a way such that the following steps can be carried out:

an address space is assigned to each program and/or each file to be protected, a process file is assigned to each program and/or each file to be protected, the process or processes that may run in the address space in question is or are stored in a process file, during the running of a program and/or a file to be protected, for a process that attempts to access the address space of the program and/or the file to be protected, a check is made to confirm whether the accessing process is included in the corresponding process file, if the accessing process is included in the process file, the accessing process is started, and otherwise the accessing process is not started.

A further array for protecting several programs from unauthorized access by a process exhibits a processor that is set up in a way such that the following steps can be carried out:

an address space is assigned to each program and/or each file to be protected, a process file is assigned to each program and/or each file to be protected, the process or processes that may run in the address space in question is or are stored in a process file, during the running of a program and/or a file to be protected, for a process that attempts to access the address space of the program and/or the file to be protected, a check is made to confirm whether the accessing process is included in the corresponding process file, if the accessing process is included in the process file, the accessing process is continued, and otherwise the accessing process is terminated.

A set of several arrays and a server array which is connected with each array of the set of several arrays and which is to protect several programs from unauthorized access by a process are set up in a way such that each array exhibits a processor that is set up in such a way that the following steps can be carried out:

an address space is assigned to each program and/or each file to be protected, a process file is assigned to each program and/or each file to be protected, the process or processes that may run in the address space in question is or are stored in a process file, during the running of a program and/or a file to be protected, for a process that attempts to access the address space of the program and/or the file to be protected, a check is made to confirm whether the accessing process is included in the corresponding process file, if the accessing process is included in the process file, the accessing process is started or continued, and otherwise an alarm signal is generated and sent to the server array, and the server array exhibits a processor that is set up in such a way that a predetermined action is triggered in dependency on at least one received alarm signal.

Address space in this context is understood to mean a program area has one program assigned to it.

The invention closes several security gaps of the operating system described in [1].

Moreover, the particular program to be protected is protected against a procedural attack (attack on a process), e.g., against a Trojan horse.

In addition, a significant advantage of the invention is seen in the fact that with scalable effort, a defined degree of security can be assured for the program to be protected.

Through the set of several arrays, each of which is connected to the server array, local protection at the arrays is possible in such a way that in the event an attack is detected, an alarm signal is generated and sent to the server array in which a predetermined action is carried out centrally. That way, it is possible to discover local processes that are not known to the server array itself.

Preferred further developments of the invention arise from the dependent claims.

In a further development, to increase the level of security that can be achieved it is advantageous to form for at least a part of the processes included in a process file a unique identifying cryptographic value, whereby the value in question is contained in the process file. The accessing process's cryptographic value is formed, and the cryptographic values of the processes are compared with each other during the check.

The cryptographic value can be a digital signature. However, a general one-way function can also be formed by using a hash function.

In a further configuration, it is advantageous to forward, in a call mechanism for a function of an operating system core with which the programs are executed, a call of the accessing process to a checking function in which the check is carried out. An efficient and thus cost-effective realization of the invention is possible in this way.

The checking function can be integrated into the monitored address space as a dynamically integrated file, which results in the achieving of a further improvement in the protective effect.

A call of an accessing process can also be forwarded to a checking function that is integrated into the operating system core, whereby the check takes place in the checking function. The security of the protection can be further increased for the programs in this way.

A further increase in the achievable level of security can be assured if a protection program that is set up in such a way that the invention can be put into practice is stored encoded and is decoded at the start of the method. After the protection program has been decoded, its integrity can be checked, and the method is carried out only if the integrity of the protection program is assured. After the integrity test of the protection program, the integrity of all of the processes contained in the process files can be checked, and the method is carried out only if the integrity of the protection program is assured. After the integrity test of the processes, the integrity of the program to be protected can be checked, and the program should be executed only if the integrity of the protection program is assured.

The invention can be used advantageously in the operating system described in [1].

Although the embodiment that is explained below describes the protection of programs, protection of several files is also easily possible using the same procedure.

An embodiment of the invention is shown in the Figures and will be described in more detail below.

Figure 5:
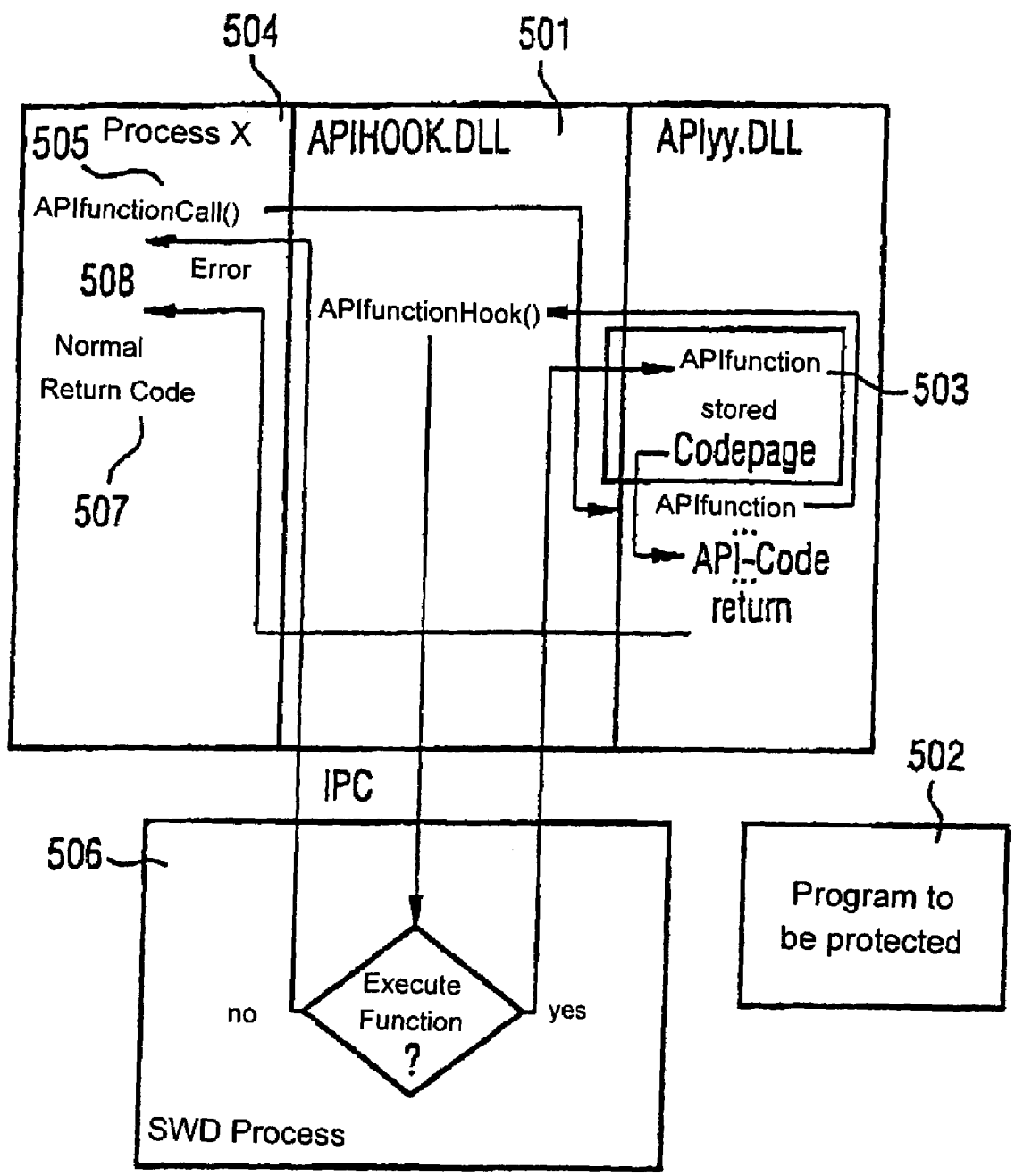
Figure 6:
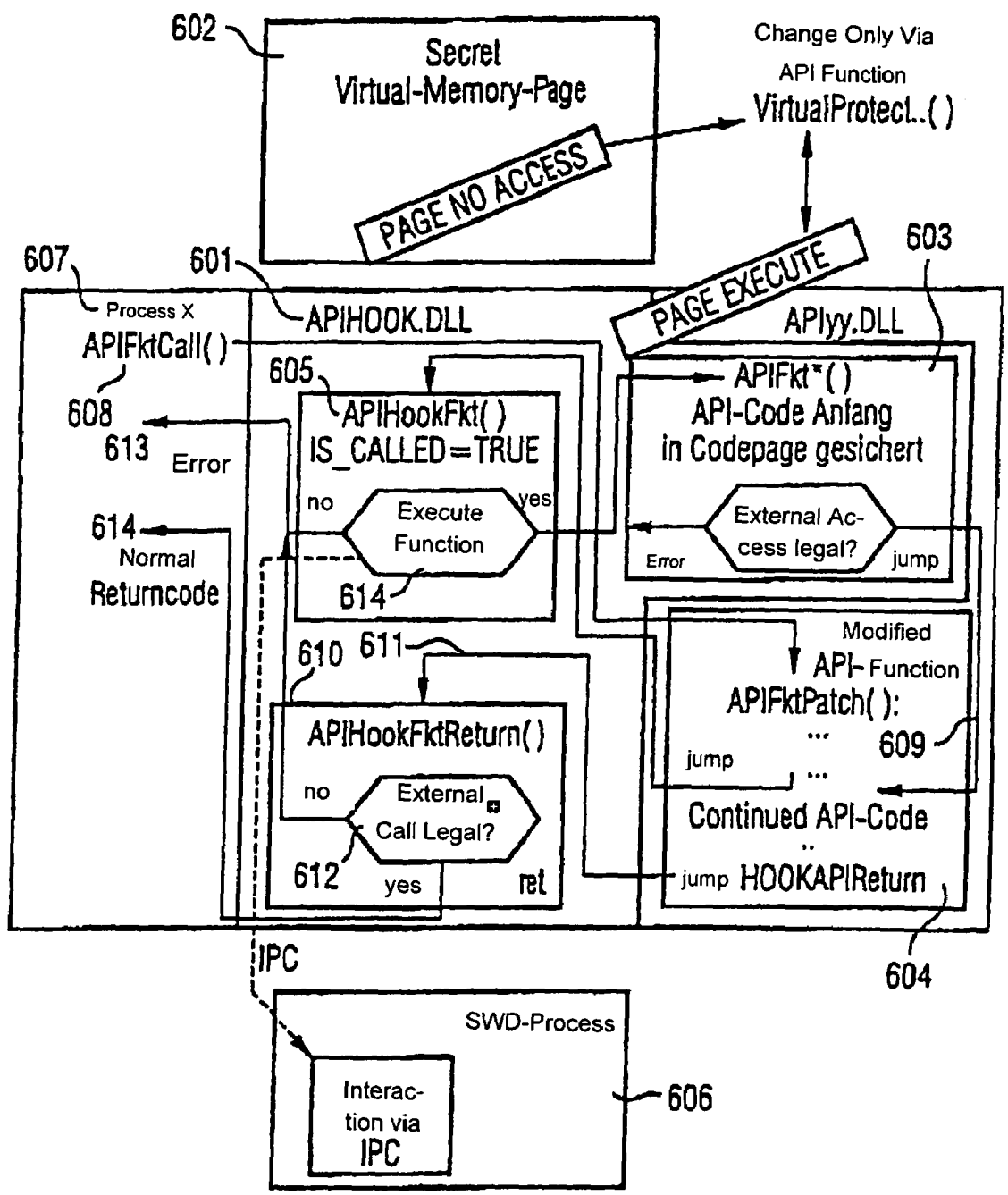

The following are shown:

FIG. 1, a sketch in which the principle on which the invention is based is shown symbolically;

FIG. 2, a sketch in which a process layer model is shown;

FIG. 3, a block diagram in which a computer network is shown;

FIG. 4, a flow chart in which the individual steps of the method of the embodiment are shown;

FIG. 5, a sketch in which the principle of a possible integration of the invention into an operating system is shown;

FIG. 6, a sketch in which the possible realization according to FIG. 5 is shown in detail;

FIG. 7, a sketch in which an additional possible integration of the invention into an operating system is shown.

FIG. 3 shows a first computer 301 with an input/output interface 302 that is connected via a bus 303 with a memory 304 and a processor 305. Through the input/output interface 302, the first computer 301 is connected via a computer network 306 with a multiplicity of computers 307, 308, 309, 310, 311.

The communications protocol used to transmit digital data is the TCP/IP protocol (Transmission Control Protocol/Internet Protocol).

The invention protects the first computer 301 against unauthorized accesses by processes that are either stored in the memory 304 of the first computer 301 or access/affect the first computer 301 from the other computers 307, 308, 309, 310, 311.

The operating system described in [1] is implemented in the first computer 301.

The principle that is explained below and that forms the basis for the method and the array is shown graphically in FIG. 1.

Symbolically represented programs 101, 102, 103 are to be protected by the invention against unauthorized access by at least one process 104, 105, 106 that attempts or attempt to access a program 101, 102, 103.

The programs 101, 102, 103 and processes 104, 105, 106 use as the operating system the operating system described in [1], which is represented as a unit 107 that surrounds the programs 101, 102, 103 and processes 104, 105, 106.

A program-specific "protective covering" 108, 109, 110 is graphically formed by the method or the array around each of the programs 101, 102, 103 to be protected. Through the program-specific safeguarding, a freely scalable level of security is achieved for the program 101, 102, 103 to be protected.

As is shown in a process layer model 201 in FIG. 2, the method or array can be realized on various logical levels of the programs 101, 102, 103 to be protected. FIG. 2 shows three logical levels in the process layer model 201.

Safeguarding against a hacker 205 can take place at the level of the application programs 202 to be protected, at the level of the operating system programs 203 to be protected, or at the level of the operating system core, as well as on the system hardware 207.

The closer to the system hardware 207 the safeguarding of a program takes place, the greater is the level of security that is achieved through the invention.

The protective covering 206 is "placed" around the program at the time the program 101, 102, 103 to be protected is being run.

The method is realized in the form of cyclical, concurrent processes. The method is explained with the aid of the flow chart shown in FIG. 4.

The first thing done following the start of the operating system (step 401) is the start of a protection program (step 402). The protection program is set up in such a way that the method described below can be executed. The protection program is stored in encoded form, as a result of which any change to the protection program itself is impossible.

The encoding of the protection program also prevents a detailed analysis of the program that is executing the method.

When the protection program is started (step 402), the protection program is decoded by a predetermined start routine, which contains the key needed for decoding the protection program and possibly additional basic functions of the operating system as well, which results in the determination of the actual program code of the protection program.

In this way, the protection program is protected in the active state against off-line attacks such as disassembling, debugging, patching, etc.

After the decoding (step 402) of the protection program, the integrity of the protection program is checked dynamically (step 403).

If the integrity of the protection program is not assured, the method is terminated (step 404).

In a further step, the integrity of the operating system processes is checked dynamically (step 405). If the integrity test is negative, the method is again terminated (step 404).

If the integrity of the processes of the operating system 405 is assured, the program to be protected is started.

The method described above is carried out dynamically for each program 101, 102, 103 to be protected.

One process file 111, 112, 113 is assigned to each program 101, 102, 103 to be protected.

The processes that may run in an address space that is also uniquely assigned to each program 101, 102, 103 are included in a process file 111, 112, 113 for the program 101, 102, 103 which is to be protected and to which the process file 111, 112, 113 is assigned. The data are stored in the process files by means of a hash function that uniquely identifies the process in question.

Following the start of the program 101, 102, 103 in question (step 407), the integrity of the program 101, 102, 103 itself is checked (step 408).

If the integrity test is negative, the method is again terminated (step 404).

If the integrity test is positive, i.e., if the integrity of the program 101, 102, 103 is assured, the method for the program 101, 102, 103 to be protected is repeated until the program to be protected is itself terminated (step 409).

The method is iterated in dependency on a predefinable event or at predefinable interval of time between two executions of the method (step 410).

As soon as a process 104, 105, 106 attempts to access the address space or the program 101, 102, 103 itself, in a further step (step 411) a check is made to whether or not the process 104, 105, 106 is contained in the process file of the program 101, 102, 103 to be protected which the process 104, 105, 106 is trying to access.

This takes place through the formation of a hash value on the accessing process 104, 105, 106 and comparison of the hash value of the accessing process 104, 105, 106 with the hash values stored in the process file. If the accessing process is included in the process file of the program 101, 102, 103 to be protected, then the process 104, 105, 106 is executed (step 412).

Otherwise, the process 104, 105, 106 is not started (step 413) and the user is informed of a possible attack on his program 101, 102, 103.

For each process that is active in the address space of a program 101, 102, 103, i.e., the process that is running, a check is made at predefinable intervals of time or in an event-controlled way to confirm whether the process in question is contained in the process file of the corresponding program 101, 102, 103 whose address space is being examined. If that is not the case, then the corresponding process is terminated and the user is notified of a possible attack on his program 101, 102, 103.

Regular monitoring of the program is assured in this way.

Options for the integration of the method described above into the operating system described in [3] are described below.

Option 1:

Integration of a dynamically linked file 501 into the application programming interface (Application Programming Interface, API) (cf. FIG. 5).

The dynamically linked file 501 becomes active in the address space of the potential accessing program 502. Using the dynamically linked file 501, the following steps are carried out in the address space of the potential accessing program 502:

From the dynamically linked file 501, all of the identifiers (module handles) are determined for every additional dynamically linked file that contains interface calls to be monitored. By doing this, all accesses to all of the dynamically linked files to be monitored can be enabled.

Considered to be attack-relevant are all interface calls for the direct or indirect starting, ending and controlling of processes, e.g., write accesses to the process memory, changes to access rights, in principle, all interface instructions that work with external process identifiers (process handles), all instructions for the realization of message hooks (a programmable filtering function for messages for GUI (Graphic User Interface) intercommunication and for process intercommunication), and for debugging purposes.

The term "indirect starting" is also understood to mean compiler mechanisms for the automatic modification of program code, OLE (Object Link Embedding) and RPC mechanisms (Remote Procedure Call), as well as accesses from other operating system programming interfaces. This term additionally includes the control of the mechanisms that are used for the execution of dynamically linked files 501 (active X instructions, etc.).

In addition, writing rights for the address space are assigned to the dynamically linked files 501.

A branch instruction is stored in place of the original interface call, and the replaced instructions of the original code 503 are saved.

If a process 504 now attempts by means of an interface call APIFktCall ( ) to access the program 502 to be protected or to start an inactive program, the protection program 506 is called via the dynamically linked file 501. As the transfer parameter for protection program 506, protection program 506 is told which program 502 is to be called by the accessing process 504.

Through a comparison with the allowable interface calls included in the process file of the program 502 in question, in accordance with the method described above, a decision can be made as to whether the interface call 505 is allowable or not.

The accessing process 504 is then either executed of "blocked." If a decision is made in the protection program 506 that the accessing process 504 should be executed, the original code of the interface call 503 is executed and, following its execution, a return code 507 is sent back to the accessing process 504. Otherwise, an error message 508 is reported to the accessing process 504.

The method described above makes use of the basic mechanism of so-called DLL injection, which is known from [5].

Option 2:

FIG. 6 shows a refined realization of the principle described in FIG. 5. This version is especially well suited for a case in which a process that has been declared "safe" is mistakenly located in the address space that the dynamically linked file 601 itself accesses.

The method described in the following ensures that an access to predefined data is possible only from the dynamically linked file 601 itself, and accesses from a different instruction sequence segment, particularly that of an accessing application, will be prevented.

The method presented in the following is preferably realized with static modification of the method described above.

The following assumptions are made with regard to the method described below:

Data to be protected are stored in a protected area 602 that is set up and described during the initialization of the dynamically linked file 601, and then receive a protection attribute so that area 602 can be accessed only through the dynamically linked file 601 itself.

All areas that contain executable code receive the protection attribute "page_execute", which prevents the executable code in question from being changed unless the protection attribute is changed beforehand.

Every interface function 603 is safeguarded in the following way: An entry address for the interface function 603 is replaced by a modified entry address that leads to a modified interface function 604.

In the modified interface function, a branch is made to an interface process 605, which is contained in the dynamically linked file 601. This interface process branches to protection program 606, which, for a calling process 607 that attempts to access the interface function 603 with an interface call 608, checks if this call is allowed for the accessing process 607.

If it is, the interface function 603 is executed and after the execution of interface function 603, another branch is made to the modified interface function 604, which is symbolized by an arrow 609. Following the execution of additional predefinable instructions, a branch is made to an interface return function 610, which is indicated by an arrow 611. This takes place by means of a branch instruction. In the interface return function 610, a check is made once again (step 612) to confirm whether the interface call 608 is allowed. If it is not, an error message 613 is send to the process 607. This takes place in exactly the same way if, using the procedure described above, it was determined in interface function 605 that the interface call is not allowed.

However, if in the checking step 612 in the interface return function 610 it is also determined that the interface call is allowed, then the result of the called interface function is sent to the accessing process 607 (step 614).

Option 3:

The invention can also be integrated in the operating system core. This form of implementation makes it possible to integrate a control mechanism that can no longer be bypassed under user access rights, but rather, only under the access rights of the system administrator. This results in a substantial increase in the level of security.

An integration mechanism that can be used for this purpose is described in [4]. Under this mechanism, with the transfer into the mode of the operating system core (kernel mode), interface calls are "intercepted" in the operating system core itself. In this instance, the administrative mechanism for the interrupt routine is realized in the operating system core, and is therefore protected against accesses by processes that are active in the user mode. A summary of a number of such alternative implementation options can be found in [4].

FIG. 7 shows an overview of two realization options described above.

An application program 701 (application) uses functions of the operating system for the program run.

The operating system functions are grouped into functions 702 of the operating system in a user mode, and functions 703 of the kernel mode. Both of these functions are symbolically illustrated as blocks.

Through the use of dynamically linked files (*.dll) it is possible to integrate the method within the framework of the user mode, which can take place through a first block 704 through the use of a dynamically linked file "NTDLL.DLL" 705 of the operating system described in [1].

The other option for integrating the method into the operating system core is indicated by a second block 706, whereby in this version of the integration, the mechanism is integrated during the transition from the user mode into the kernel mode.

Several alternatives to the implementation examples explained above will be presented in the following:

The protection of the protection program can be increased by integrating the start routine in the operating system core, e.g., as a so-called kernel mode process or as system service.

The dynamically linked file can also be provided both statically and dynamically, i.e., only during the run time of the program 502 to be protected, or during the entire run time of the operating system.

Alternative software interrupt routines can also be used as alternatives to the dynamically linked file.

The invention can be realized both by means of software as well as by means of hardware, or partly by means of software and partly by means of hardware.

In addition, as is shown in FIG. 4, if the integrity test is negative (step 408), a check is made in an additional checking step (step 414) to confirm whether a reloading of the original protection program and/or a program to be protected is possible from a trustworthy authority, or if a recovery of the protection program and/or the program to be protected is possible in a way such that its/their integrity is assured.

If that is not possible, the method is terminated (step 404).

If that is possible, however, the integrity of the reloaded or recovered protection program is dynamically checked further (step 403).

In an additional variant, provision is made that the computers are connected to a server, the first computer in FIG. 1.

The method described above for the protection of a program and/or a file is carried out in each computer.

If the accessing process is not included in the process file, an alarm signal is generated and sent to the server. In the server, in dependency on at least one alarm signal a predetermined action is triggered, for example, a centrally controlled termination of a process.

The following publications were cited within the framework of this document:

[1] Microsoft Windows NT workstation resource kit: Comprehensive resource guide and utilities for Windows NT 4.0, ISBN 1-57231-343-9, Microsoft Press, C. Doyle (ed.), pp. 117–118, 1996

[2] Dr. Solomon's Anti-Virus Toolkit Workstation, available to the public on the Internet on Jul. 3, 1998 at Internet address: http://www.drsolomon.de/produkte/avtkws/avtkws.html

[3] M. Petrek, Under the hood, MS Journal, No. 12, December 1996

[4] M. Russinovich, Windows NT System-Call Hooking, Dr. Dobb's Journal, pp. 42–46, January 1997

[5] J. Richter, Advanced Windows, ISBN 1-573231-548-2, 3rd Edition, p. 899 ff., Chapter: Breaking Through Process-Boundary Walls, 1997

[6] U.S. Pat. No. 5,390,310

[7] U.S. Pat. No. 5,023,907

The invention claimed is:

1. A method for protecting several programs from unauthorized access by processes, comprising:
    assigning an address space to each program to be protected;
    assigning a process file to each program to be protected, where the process file is separate from the program and includes a cryptographic value that uniquely identifies each process that may run in the address space;
    forwarding, in a call mechanism for a function of an operating system core with which each program to be protected is executed, for each accessing process that attempts to access the address space of the program, a call of the accessing process to a checking function integrated into at least one of the address space of the program and the process file to be protected as a dynamically integrated file;
    determining in the checking function whether the accessing process is listed in the process file assigned to the program by
        forming an accessing cryptographic value for each accessing process, and
        comparing the accessing cryptographic value with the cryptographic value stored in the process file for each accessing process listed in the process file; and
    at least one of starting and continuing execution of the accessing process only if said comparing determines a match between the accessing cryptographic value and the cryptographic value stored in the process file for the accessing process.

2. An array for protecting several programs from unauthorized access by a process, comprising:
    a processor programmed to assign an address space and a process file to each program to be protected, where the process file is separate from the program and includes a crypto-graphic value that uniquely identifies each process that may run in the address space; to forward, in a call mechanism for a function of an operating system core with which each program to be protected is executed, for each accessing process that attempts to access the address space of the program, a call of the accessing process to a checking function integrated into at least one of the address space of the program and the process file to be protected as a dynamically integrated file; to determine, during execution of each program to be protected, for each accessing process that attempts to access the address space of the program, whether the accessing process is listed in the process file assigned to the program by forming an accessing cryptographic value for each accessing process and comparing the accessing cryptographic value with the cryptographic value stored in the process file for each accessing process listed in the process file; and to at least one of start and continue execution of the accessing process only if a match is found between the accessing cryptographic value and the cryptographic value stored in the process file for the accessing process.

3. A method according to claim 1, wherein a call of the accessing process is forwarded to a checking function in which the check takes place, and wherein the checking function is integrated into an operating system core of an operating system with which the programs are executed.

4. A method according to claim 1, wherein in dependency on a predetermined event for each active process that runs along with a program and/or a file to be protected, a check is made to confirm whether the active process is contained in the process file that is assigned to the program to be protected, and the process is ended if that is not the case.

5. A method according to claim 1, wherein a protection program performing the method according to claim 1 is stored encoded and is decoded at the start of the method.

6. A method according to claim 5, wherein the programs to be protected are stored encoded and are decoded at the start of the method.

7. A method according to claim 5, wherein after the decoding of the protection program, its integrity is checked and the method according to claim 1 is executed only if the integrity of the protection program is assured.

8. A method according to claim 7, wherein after the integrity test of the protection program, the integrity of all processes contained in the process files is checked and the method according to claim 1 is executed only if the integrity of all of the processes contained in the process files is assured.

9. A method according to claim 8, wherein after the integrity test of the processes, the integrity of the program to be protected is checked and the method according to claim 1 is executed only if the integrity of the program to be protected is assured.

10. A method according to claim 9, wherein at least one of the integrity tests takes place through the use of a cryptographic method.

11. A method according to claim 10, wherein the cryptographic value is formed through the use of a hash function.

12. An array according to claim 2, wherein the processor is programmed to execute a call mechanism for a function of an operating system core with which the programs are executed, and a call of the accessing process is forwarded to a checking function to compare the accessing cryptographic value with the cryptographic value stored in the process file.

13. A method for protecting several programs from unauthorized access by processes, comprising:
    assigning an address space to each program file to be protected;
    assigning a process file, separate from the program file, to each program file to be protected, where the process includes at least one cryptographic value, each uniquely identifying a process that may run in the address space;
    forwarding, in a call mechanism for a function of an operating system core with which each program file to be protected is executed, for each accessing process that attempts to access the address space of the program file, a call of the accessing process to a checking function integrated into at least one of the address space of the program file and the process file to be protected as a dynamically integrated file;
    determining, during execution of each program in each program file to be protected, for each accessing process that attempts to access the address space of the program file, whether the accessing process is listed in the process file assigned to the program file by
forming an accessing cryptographic value for each accessing process, and
comparing the accessing cryptographic value with the cryptographic value stored in the process file for each accessing process listed in the process file; and
at least one of starting and continuing execution of the accessing process only if said comparing determines a match between the accessing cryptographic value and the cryptographic value stored in the process file for the accessing process.

14. An array for protecting several program files from unauthorized access by a process, comprising:
a processor programmed to assign an address space and a process file to each program file to be protected, where the process file is separate from the program file and includes a cryptographic value that uniquely identifies each process that may run in the address space; to forward, in a call mechanism for a function of an operating system core with which each program file to be protected is executed, for each accessing process that attempts to access the address space of the program file, a call of the accessing process to a checking function integrated into at least one of the address space of the program file and the process file to be protected as a dynamically integrated file; to determine, during execution of each program in each program file to be protected, for each accessing process that attempts to access the address space of the program file, whether the accessing process is listed in the process file assigned to the program file by forming an accessing cryptographic value for each accessing process and comparing the accessing cryptographic value with the cryptographic value stored in the process file for each accessing process listed in the process file; and to at least one of start and continue execution of the accessing process only if a match is found between the accessing cryptographic value and the cryptographic value stored in the process file for the accessing process.

15. A set of several arrays and a server array connected with each of the several arrays, to protect several programs from unauthorized access by a process, comprising
in each of the several arrays a processor programmed to assign an address space and a process file to each program file to be protected, where the process file is separate from the program file and includes a cryptographic value that uniquely identifies each process that may run in the address space; to forward, in a call mechanism for a function of an operating system core with which each program to be protected is executed, for each accessing process that attempts to access the address space of the program, a call of the accessing process to a checking function integrated into at least one of the address space of the program and the process file to be protected as a dynamically integrated file; to determine, during execution of each program in each program file to be protected, for each accessing process that attempts to access the address space of the program file, whether the accessing process is listed in the process file assigned to the program file by forming an accessing cryptographic value for each accessing process and comparing the accessing cryptographic value with the cryptographic value stored in the process file for each accessing process listed in the process file; and to at least one of start and continue execution of the accessing process only if a match is found between the accessing cryptographic value and the cryptographic value stored in the process file for the accessing process.

16. A method for protecting several programs from unauthorized access by processes, comprising:
assigning an address space to each program to be protected;
assigning a process file to each program to be protected, where the process file is separate from the program and includes a cryptographic value that uniquely identifies each process that may run in the address space;
determining, during execution of each program to be protected, for each accessing process that attempts to access the address space of the program, whether the accessing process is listed in the process file assigned to the program by
forming an accessing cryptographic value for each accessing process, and
comparing the accessing cryptographic value with the cryptographic value stored in the process file for each accessing process listed in the process file;
at least one of starting and continuing execution of the accessing process only if said comparing determines a match between the accessing cryptographic value and the cryptographic value stored in the process file for the accessing process; and
checking, at a predetermined interval of time for each active process that runs along with a program and/or a file to be protected, to confirm whether the active process is contained in the process file that is assigned to the program and/or the file to be protected, and the process is ended if that is not the case.

* * * * *